(12) United States Patent
Chen et al.

(10) Patent No.: US 7,741,822 B2
(45) Date of Patent: Jun. 22, 2010

(54) DC-DC CONVERTER

(75) Inventors: Ke-Horng Chen, Taipei County (TW);
Sy-Yen Kuo, Taipei (TW); Hong-Wei Huang, Taichung County (TW);
Ruei-Ming Gan, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 394 days.

(21) Appl. No.: 12/016,617

(22) Filed: Jan. 18, 2008

(65) Prior Publication Data

US 2009/0039842 A1 Feb. 12, 2009

(30) Foreign Application Priority Data

Aug. 9, 2007 (TW) .............................. 96129357 A

(51) Int. Cl.
*G05F 1/56* (2006.01)
(52) U.S. Cl. ..................... 323/272; 323/283; 363/41
(58) Field of Classification Search ................ 323/272, 323/274, 282–288, 298, 312–315, 224; 327/199, 327/215, 219; 363/56.07, 35, 47, 17, 41, 363/131, 132
See application file for complete search history.

(56) References Cited

U.S. PATENT DOCUMENTS

| 5,237,262 | A | * | 8/1993 | Ashley et al. | 323/284 |
| 6,628,106 | B1 | * | 9/2003 | Batarseh et al. | 323/222 |
| RE38,371 | E | * | 12/2003 | Dinh | 323/282 |
| 7,030,596 | B1 | * | 4/2006 | Salerno et al. | 323/282 |
| 7,638,991 | B1 | * | 12/2009 | Kobayashi | 323/272 |

* cited by examiner

*Primary Examiner*—Rajnikant B Patel
(74) *Attorney, Agent, or Firm*—Quintero Law Office

(57) ABSTRACT

The invention provides DC-DC converters comprising a load sensor, a variable Power MOS, and a Power MOS width controlling and driving device. The Power MOS width controlling and driving device is coupled between the load sensor and the variable Power MOS. The variable Power MOS comprises a plurality of PMOS transistors coupled in parallel and a plurality of NMOS transistors coupled in parallel. After the load sensor detects the load current of the DC-DC converter, the Power MOS width controlling and driving device conducts the PMOS and NMOS transistors according to the sensed load current to control the total size of the conduction paths that couple a transformed DC voltage output terminal to a source of an original DC voltage or ground.

16 Claims, 15 Drawing Sheets

DC-DC CONVERTER

BACKGROUND OF THE INVENTION

1. Field of the Invention

The present invention relates to DC-DC converters.

2. Description of the Related Art

FIG. 1 illustrates a conventional DC-DC converter that transforms an original DC voltage $V_{DD}$ to a transformed DC voltage $V_{out}$ and outputs $V_{out}$ by a transformed DC voltage output terminal. The conventional DC-DC converter comprises an inductance L, a PWM signal generator 102 (where PWM is an abbreviation of Pulse Width Modulation), a Power MOS enable signal generator 104, a Power MOS 110, a driver 106 for the PMOS transistor $M_p$ of the Power MOS 110, and a driver 108 for the NMOS transistor $M_n$ of the Power MOS 110.

The transformed DC voltage $V_{out}$ is divided by resistors $R_1$ and $R_2$ that are coupled in series. The divided transformed DC voltage is inputted into the PWM signal generator 102 to generate a PWM signal $V_{switch}$. The Power MOS enable signal generator 104 comprises a DTC 112 (where DTC is the abbreviation of Dead-Time Controller) and a ZCD 114 (where ZCD is the abbreviation of Zero Current Detector). The DTC 112 outputs a PMOS transistor enable signal SW_P and the ZCD 114 outputs an NMOS transistor enable signal SW_N. When the PMOS transistor enable signal SW_P is in its enable state (low), the driver 106 pulls the PMOS transistor enable signal SW_P to ground to completely turn on the PMOS transistor $M_p$. When the NMOS transistor enable signal SW_N is in its enable state (high), the driver 108 pulls the NMOS transistor enable signal SW_N to the original DC voltage $V_{DD}$ to completely turn on the NMOS transistor $M_n$. The transformed DC voltage $V_{out}$, therefore, is maintained within a stable region.

In general, conventional DC-DC converters are designed based on specifications provided by manufactures of loads, and thus the power consumption of the DC-DC converter is predetermined. The predetermined power consumption is usually designed as the maximum possible value under which the load can operate normally. However, when the load is a processing unit, RAM, monitor and so on, or devices that are usually in a stand-by mode (light load), the actual power consumption is far lower than the predetermined value. Thus, the conventional DC-DC converter with light load has very poor power transform efficiency.

BRIEF SUMMARY OF THE INVENTION

The invention discloses DC-DC converters. The DC-DC converter comprises a load sensor, a variable Power MOS, a Power MOS width controlling and driving device. The load sensor senses a load current of the DC-DC converter. The variable Power MOS comprises a plurality of PMOS transistors and a plurality of NMOS transistors. The PMOS transistors are coupled in parallel and the NMOS transistors are coupled in parallel. The Power MOS width controlling and driving device is coupled between the load sensor and the variable Power MOS, and is used for controlling the conductance of the PMOS and NMOS transistors. The Power MOS width controlling and driving device controls and drives the variable Power MOS to provide different total size of conducting transistors according to the sensed load current to adjust the transformed DC voltage outputted by the DC-DC converter.

The invention further provides DC-DC converters comprising a load sensor, a Dithering Skip Modulation controller (DSM controller), a PWM signal generator, an NAND gate, a Power MOS enable signal generator, and a Power MOS. The load sensor senses a load current of the DC-DC converter. The DSM controller determines a Dithering Skip Modulation control section (DSM control section) based on the sensed load current. The lower the sensed load current is, the longer the DSM control section is. The DSM controller further divides the DSM control section by a Dithering Skip Modulation unit length (DSM unit length, each comprising a DSM indicator) to generate a Dithering Skip Modulation signal (DSM signal), which is low during the Dithering Skip DSM indicators. The PWM signal generator generates a PWM signal based on a transformed DC voltage of the DC-DC converter. The inverse signal of the PWM signal and the DSM signal are both sent into the NAND gate. Based on the output of the NAND gate, the Power MOS enable signal generator generates a PMOS transistor enable signal and an NMOS transistor enable signal controlling the Power MOS to adjust the transformed DC voltage.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows some embodiments carrying out the invention. This description is made for the purpose of illustrating the general principles of the invention and should not be taken in a limiting sense. The scope of the invention is best determined by reference to the appended claims.

Figure 1:
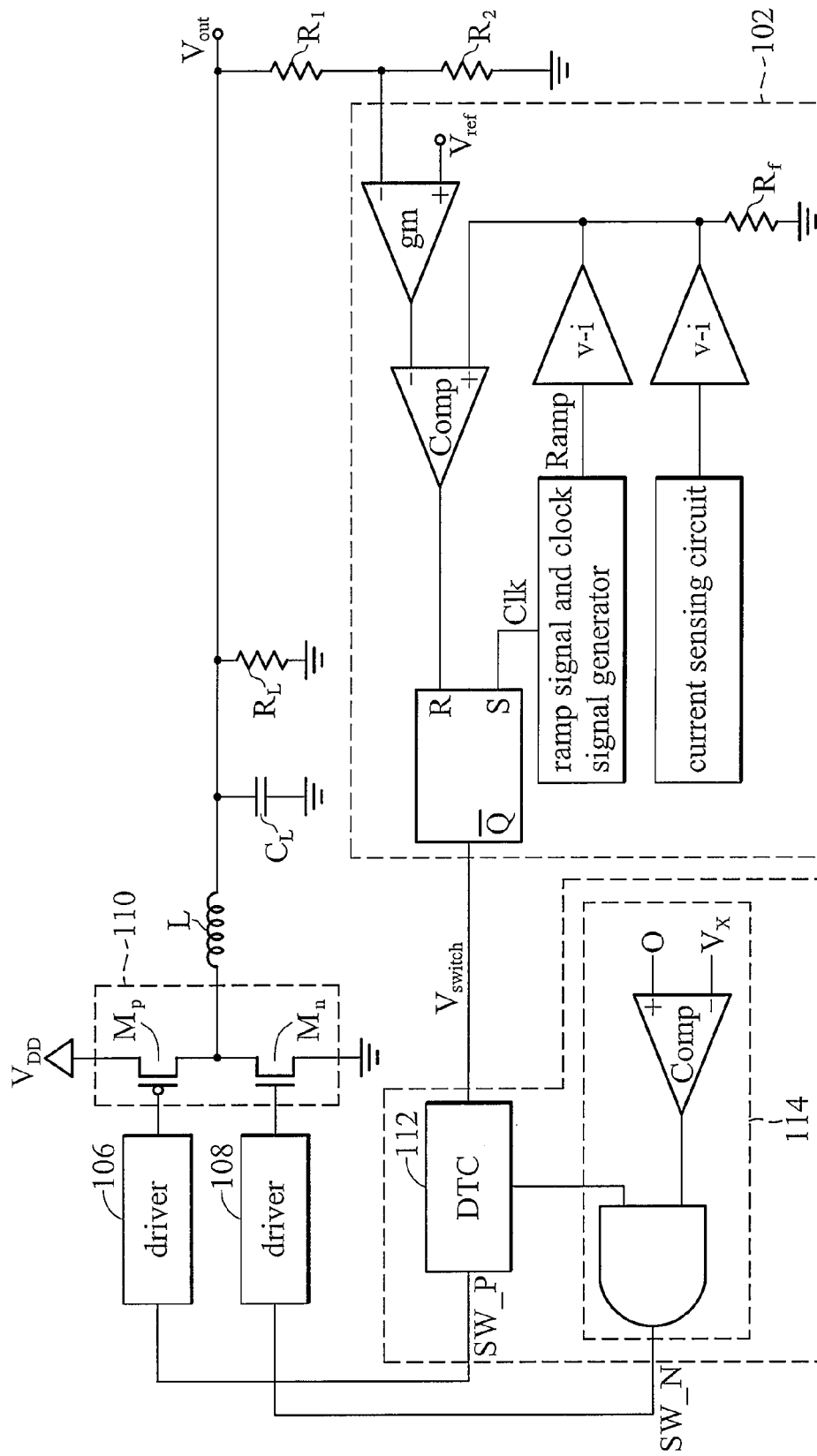
FIG. 1 illustrates a conventional DC-DC converter.
Figure 2:
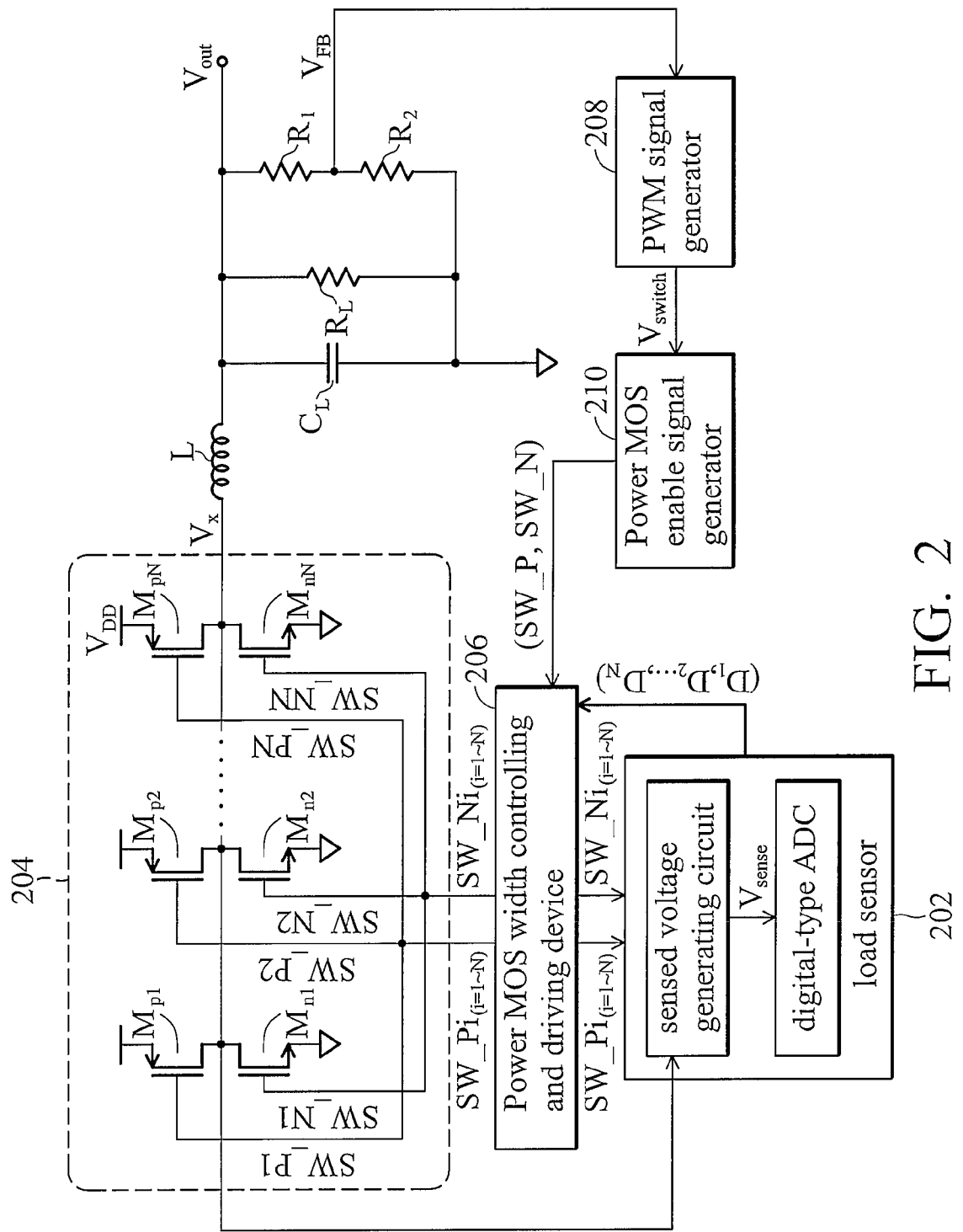
FIG. 2 illustrates an embodiment of the DC-DC converter of the invention.

FIG. 2 illustrates an embodiment of the DC-DC converter of the invention, comprising an inductance L, a load sensor 202, a variable Power MOS 204 and a Power MOS width controlling and driving device 206. The variable Power MOS 204 comprises a plurality of small-sized PMOS transistors $M_{p1} \sim M_{pN}$ that are coupled in parallel and a plurality of small-sized NMOS transistors $M_{n1} \sim M_{nN}$ that are coupled in parallel. Comparing the conventional Power MOS 110 of FIG. 1 with the variable Power MOS 204, the large-sized PMOS transistor $M_p$ of the conventional Power MOS 110 is replaced with the small-sized PMOS transistors $M_{p1} \sim M_{pN}$ and the large-sized NMOS transistor $M_n$ of the conventional Power MOS 110 is replaced with the small-sized NMOS transistors $M_{n1} \sim M_{nN}$. The small-sized PMOS transistors ($M_{p1} \sim M_{pN}$) provide a path coupling the original DC voltage $V_{DD}$ to the transformed DC voltage output terminal (whose voltage level is $V_{out}$) of the DC-DC converter via the inductance L. The small-sized NMOS transistors ($M_{n1} \sim M_{nN}$) provide a path coupling the transformed DC voltage output terminal ($V_{out}$) to ground via the inductance L. In the conventional DC-DC converter shown in FIG. 1, the size of the conventional Power MOS 110 is constant in various loads; meaning that the conduction paths, provided by the Power MOS 110, to the original DC voltage $V_{DD}$ and the ground, are constant at every load. In this invention, however, the variable Power MOS 204 provides various conduction path sizes for various loads. The size of working PMOS and NMOS transistors is proportional to the load current of the DC-DC converter. Thus, after the load sensor 202 senses the load current, the Power MOS width controlling and driving device 206 coupled between the load sensor 202 and the variable Power MOS 204 controls the conductance of the small-sized PMOS and NMOS transistors ($M_{p1} \sim M_{pN}$ and $M_{n1} \sim M_{nN}$) according to the sensed load current.

Referring to the conventional DC-DC converter shown in FIG. 1, because the conventional Power MOS 110 has a large size, the drivers 106 and 108 driving the PMOS and NMOS transistors $M_p$ and $M_n$, require having large sizes too. In heavy load situations (having high load current), the main power consumption of the conventional DC-DC converter is the conduction loss of the large-sized Power MOS 110. In light load situations (having low load current), the main power consumption is the switching losses of the large-sized Power MOS 110 and the large-sized drivers 106 and 108. The variable Power MOS 204 providing conduction path proportional to the load current can successfully improve the power efficiency of the DC-DC converter. In heavy load situations, the variable Power MOS 204 provides wide conduction path to adjust the transformed DC voltage $V_{out}$ so that equivalent resistance of the conduction path is reduced and the conduction loss of the variable Power MOS 204 is reduced. In light load situations, only a few PMOS or NMOS transistors of the variable Power MOS 204 is conducted to provide narrow conduction path to adjust the transformed DC voltage $V_{out}$ so that the switching losses of the variable Power MOS 204 and the driver are reduced.

Referring to the variable Power MOS 204, the sources of the PMOS transistors $M_{p1} \sim M_{pN}$ are coupled to the original DC voltage $V_{DD}$, and the drains of $M_{p1} \sim M_{pN}$ are coupled to a first terminal $V_x$. Additionally, the drains of the NMOS transistors $M_{n1} \sim M_{nN}$ are coupled to the first terminal $V_x$, and the sources of $M_{n1} \sim M_{nN}$ are coupled to ground. The first terminal $V_x$ is coupled to the inductance L to couple to the transformed DC voltage output terminal ($V_{out}$).

Referring to FIG. 2, the PWM signal generator 208 and the Power MOS enable signal generator 210 are used for generating a PMOS transistor enable signal SW_P and an NMOS transistor enable signal SW_N. The PWM signal generator 208 and the Power MOS enable signal generator 210 can be replaced with other devices that can generate the PMOS and NMOS transistor enable signals SW_P and SW_N.

Figure 3:
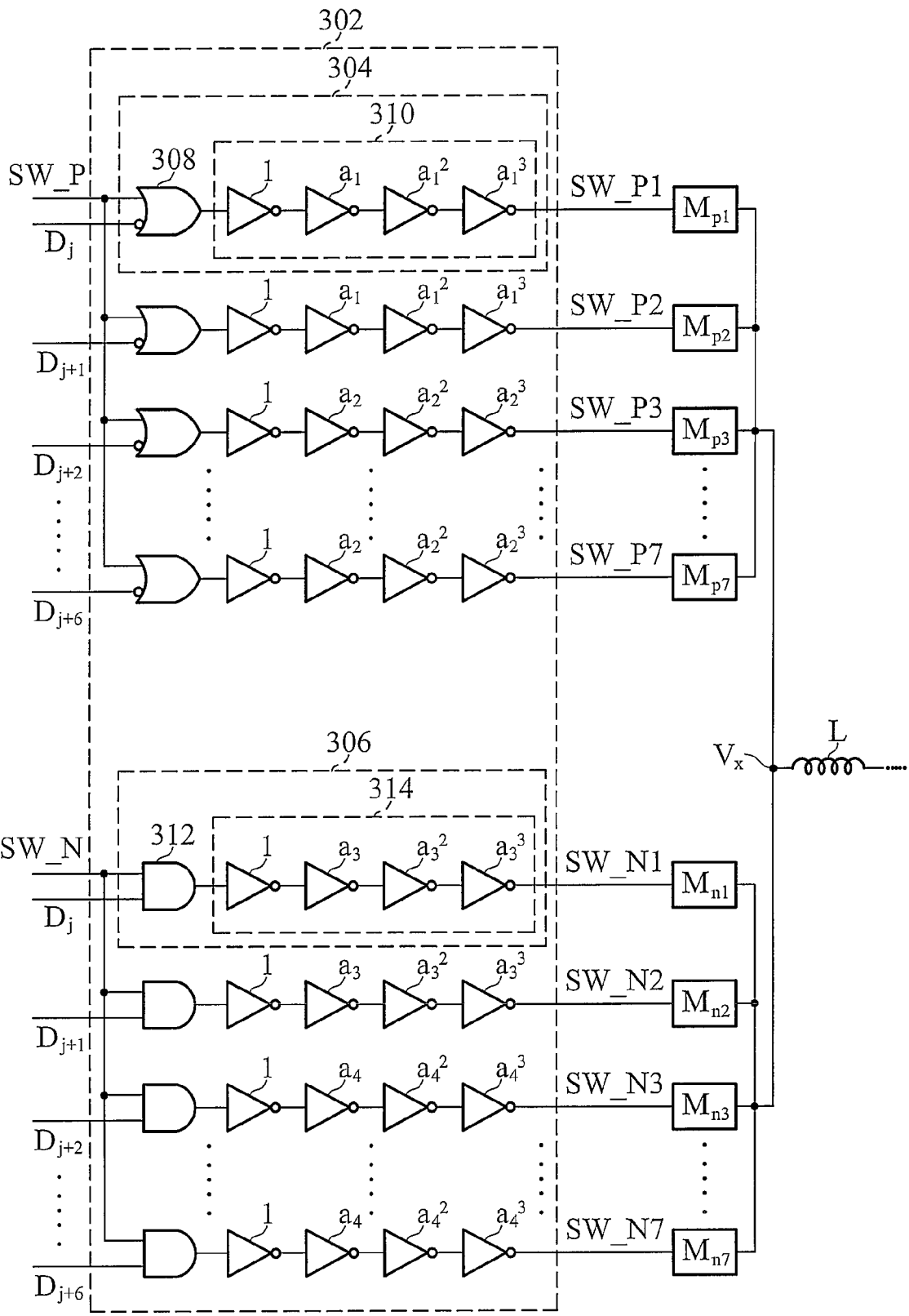
FIG. 3 illustrates an embodiment of the Power MOS width controlling and driving device of the invention.

The digital bits ($D_1, D_2 \ldots D_N$) outputted from the load sensor 202 are thermometer code, and they indicate the value of the load current. The greater the load current, the more digital bits ($D_1, D_2 \ldots D_N$) are high. The digital bits ($D_1, D_2 \ldots D_N$), the PMOS transistors $M_{p1} \sim M_{pN}$ and the NMOS transistors $M_{n1} \sim M_{nN}$ have a one-to-one relationship. FIG. 3 illustrates an embodiment of the Power MOS width controlling and driving device 206. Referring to FIG. 3, the variable Power MOS is composed of seven small-sized conventional Power MOSs (N=7), and their corresponding PMOS transistors and NMOS transistors are symbolized by $M_{p1} \sim M_{p7}$ and $M_{n1} \sim M_{n7}$. The Power MOS width controlling and driving device 302 comprises a plurality of first control units (as that shown in block 304) and a plurality of second control units (as that shown in block 306). The first control unit 304 outputs a signal SW_P1, controlling the conductance of the PMOS transistor $M_{p1}$, based on the PMOS transistor enable signal SW_P and the digital bit $D_j$. When the PMOS transistor enable signal SW_P is in its enable state (low), the value of signal SW_P1 is dependent on the digital bit $D_j$. The PMOS transistors $M_{p1}$ is turned on only when the PMOS transistor enable signal SW_P is in its enable state (low) and its corresponding digital bit $D_j$ is high. The second control unit 306 outputs a signal SW_N1, controlling the conductance of the NMOS transistor $M_{n1}$, based on the NMOS transistor enable signal SW_N and the digital bit $D_j$. When the NMOS transistor enable signal SW_N is in its enable state (high), the value of SW_N1 is dependent on the digital bit $D_j$. The NMOS transistor $M_{n1}$ is turned on only when the NMOS transistor enable signal SW_N is in its enable state (high) and its corresponding digital bit $D_j$ is high.

In the embodiment shown in FIG. 3, the first control unit 304 comprises a logic circuit 308 and a driving circuit 310. The output of the logic circuit 308 is low only when the PMOS transistor enable signal SW_P is low and the digital bit $D_j$ is high. The driving circuit 310 is used for pulling the low value outputted from the logic circuit 308 to ground to completely turn on the PMOS transistor $M_{p1}$. The second control unit 306 comprises a logic circuit 312 and a driving circuit 314. The output of the second control unit 306 is high only when the NMOS transistor enable signal SW_N is in its enable state (high) and the digital bit $D_j$ is high. The driving circuit 314 is used for pulling the high value outputted from the logic circuit 312 to approach the original DC voltage $V_{DD}$ to completely turn on the NMOS transistor $M_{n1}$.

Figure 4:
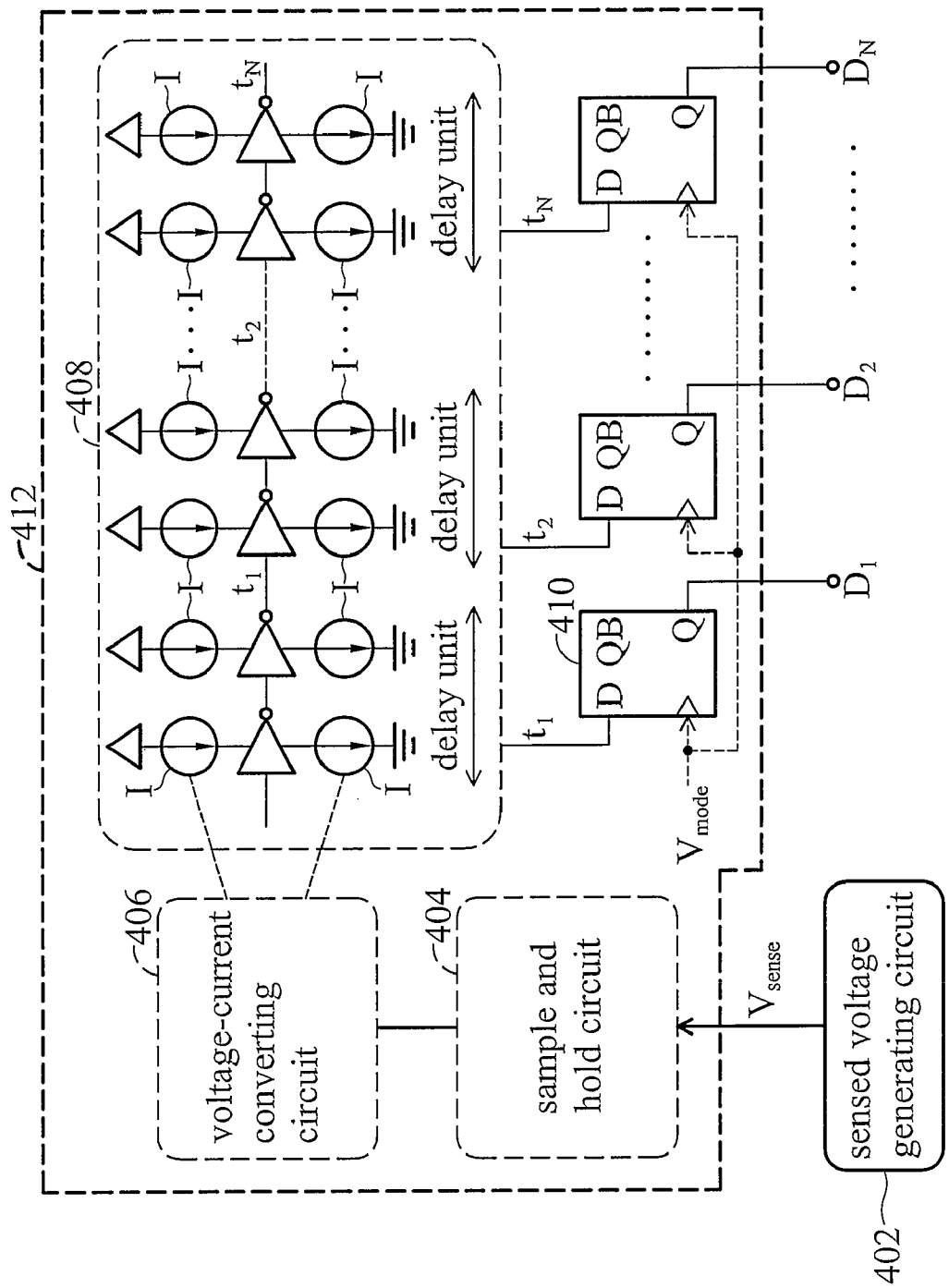
FIG. 4 illustrates an embodiment of the load sensor 202.

FIG. 4 illustrates an embodiment of the load sensor 202, comprising a sensed voltage generating circuit 402, a sample and hold circuit 404, a voltage-current converting circuit 406, a current-driving delay circuit 408 and a plurality of D-type flip-flops 410. The sensed voltage generating circuit 402 shrinks the current through the inductance L by a constant ratio to generate a sensed current, and forces the sensed current to flow through a sensing resistor to generate a sensed voltage $V_{sense}$. The sample and hold circuit 404 samples the sensed voltage $V_{sense}$. The voltage-current converting circuit 406 converts the sampled voltage $V_{sense}$ to a driving current I. The driving current I is proportional to the sensed voltage $V_{sense}$. As shown in FIG. 4, the current-driving delay circuit 408 comprises a plurality of delay units coupled in series to transmit a high level signal. In this case, each delay unit comprises two inverters, which are coupled in series and each is driven by the driving current I. The D-type flip-flops are all triggered by a trigger signal $V_{mode}$ to collect the outputs of the delay units ($t_1 \sim t_N$). The D-type flip-flops output the collected signals ($t_1 \sim t_N$) as digital bits $D_1 \sim D_N$. Because the speed of the delay units transmitting the high level signal is proportional to the driving current I, the greater the driving current I is, the more of the digital bits $D_1 \sim D_N$ are high. Because the driving current I is proportional to the load current of the DC-DC converter, the greater the load current is, the more of the digital bits $D_1 \sim D_N$ are high. Thus, the digital bits $D_1 \sim D_N$ can be used in identifying the value of the load current. The sample and hold circuit 404, the voltage-current converting circuit 406, the current-driving delay circuit 408 and the D-type flip-flops 410 form a digital-type analog-to-digital converter (digital-type ADC), which replace the analog-type converting circuit used in conventional techniques.

Figure 5:
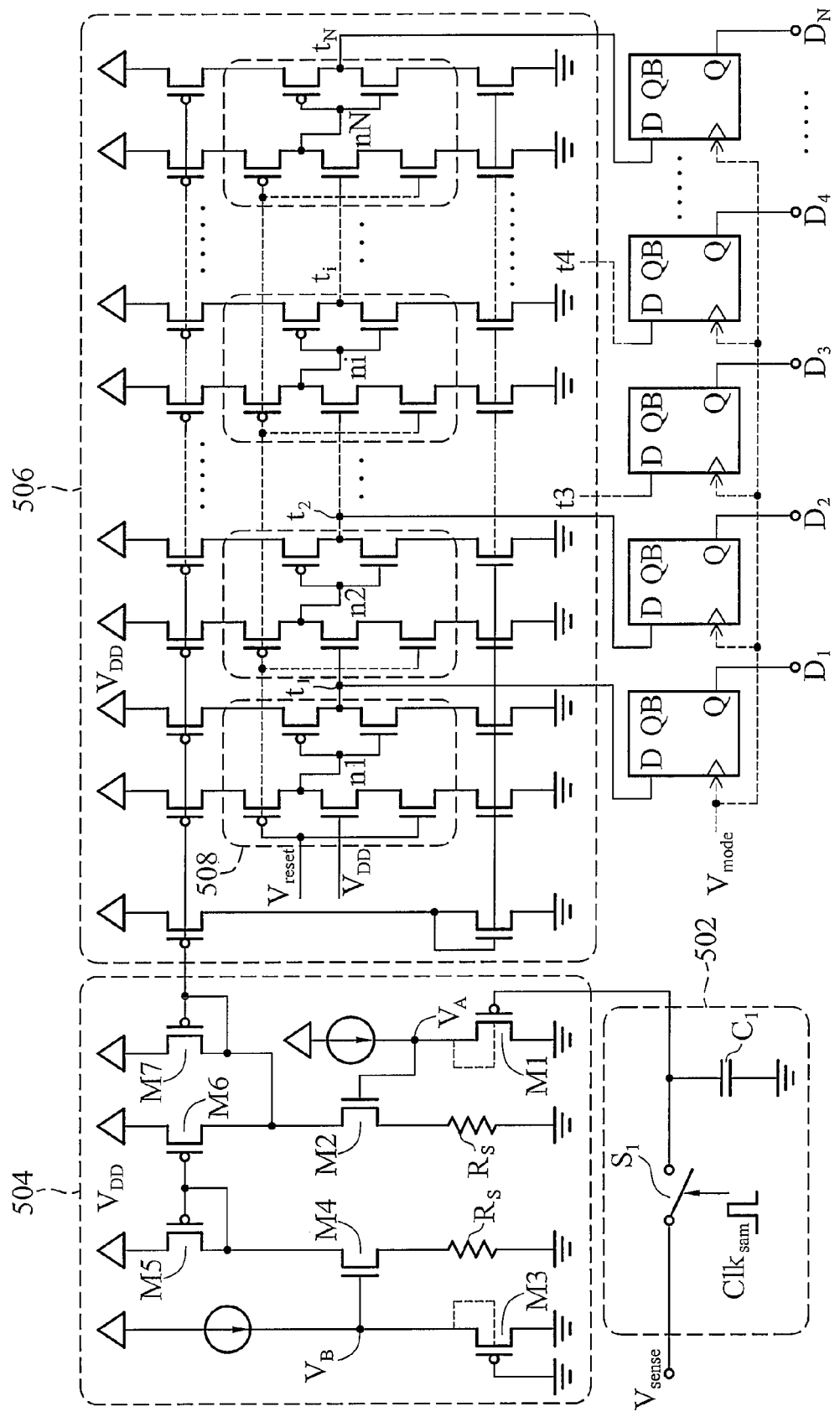
FIG. 5 illustrates an embodiment of the digital-type ADC 412.
Figure 6:
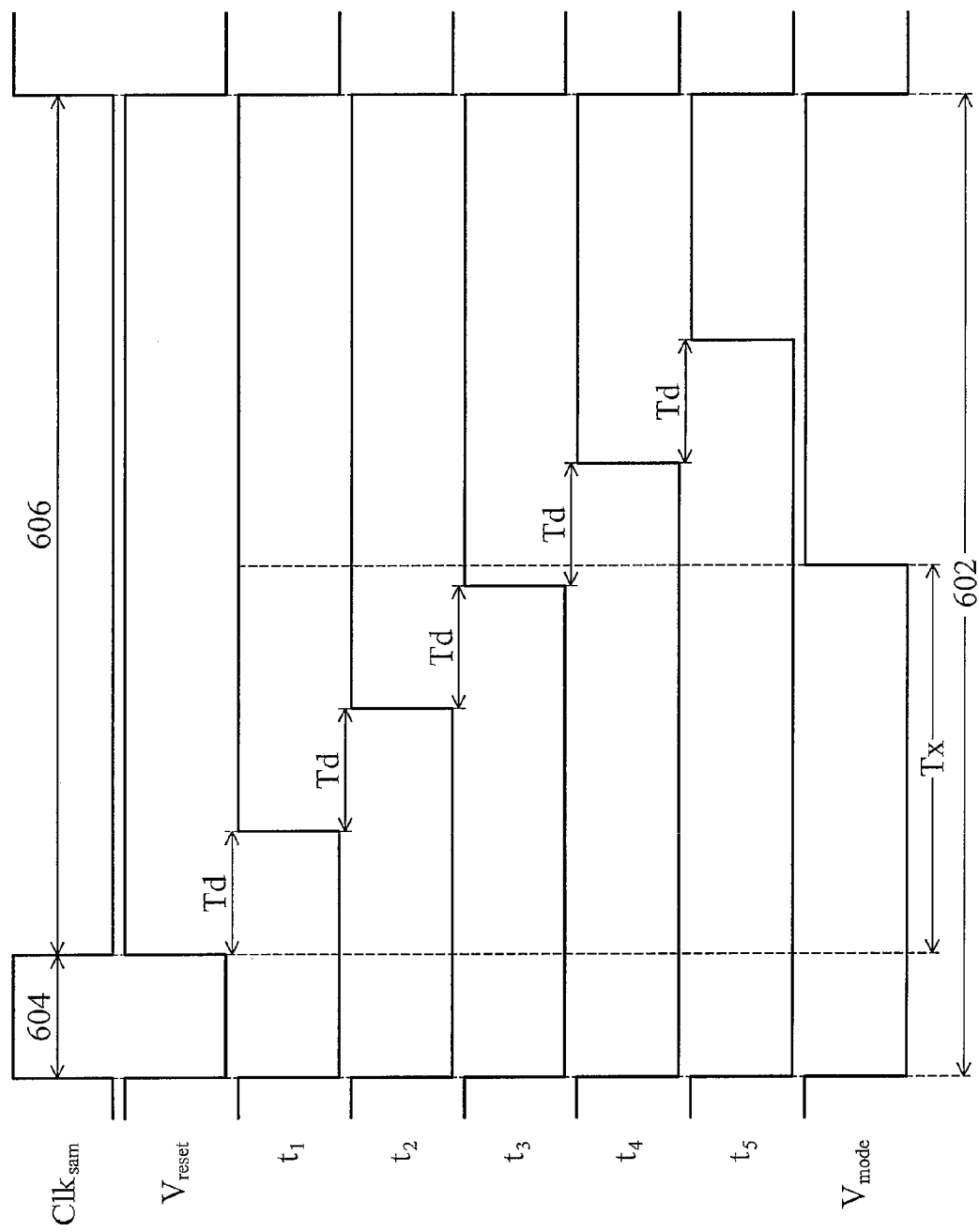
FIG. 6 shows waveforms of signals in the digital-type ADC of FIG. 5.

FIG. 5 illustrates an embodiment of the digital-type ADC 412. Circuit 502, 504 and 506 correspond to the sample and hold circuit 404, the voltage-current converting circuit 406 and the current driving delay circuit 408, respectively. In a situation the variable Power MOS is composed of five small-sized Power MOSs (N=5), the waveforms of the outputs of the five delay units ($t_1 \sim t_5$) are shown in FIG. 6. The load current sensing period 602 is divided into a sample period 604 and a hold period 606. In the sample period 604, the switch $S_1$ of the sample and hold circuit 502 is turned on and the sensed voltage $V_{sense}$ is sampled. In the hold period 606, the switch $S_1$ is turned off and the sampled sensed voltage is held and sent to the voltage-current converting circuit 504. The voltage-current converting circuit 504 converts $V_{sense}$ into a driving current driving the inverters of the current-driving delay circuit 506. Referring to FIGS. 5 and 6, a signal $V_{reset}$ is coupled to the first stage of the delay units (508) and is raised from low to high when entering the hold period 606. $V_{reset}$ is transmitted to the following stages of the delay units, and the output signals of the delay units are symbolized as $t_1 \sim t_5$. After entering the hold period 606 $T_x$ time interval, the trigger signal $V_{mode}$ rises from low to high to trigger the D-type flip-flops to collect the output signals of the delay units ($t_1 \sim t_5$). The D-type flip-flops output digital bits $D_1 \sim D_5$ to represent the collected signals. Because the transmission speed of the delay units is proportional to the driving current of the inverters of the delay units and the driving current is proportional to the load current of the DC-DC converter, the greater the load current is, the shorter the delay time $T_d$ is and the more of the digital bits $D_1 \sim D_5$ are high. In the waveforms shown in FIG. 6, the digital bits ($D_1 \ldots D_5$) collected by the trigger signal $V_{mode}$ are (1, 1, 1, 0, 0). The digital bits ($D_1 \ldots D_5$) form a thermometer code, and each high digital bit indicates a uniform load current increment. Some embodiments further comprise a thermometer code—binary code converter converting the digital bits ($D_1 \ldots D_5$) into a binary signal. In such embodiments, some modifications of the Power MOS width controlling and driving device 206 are required.

Because the transmission speed of the delay units is dependent on the temperature, the invention further discloses a special designed voltage-current converting circuit to compensate for the temperature deviation, as shown in by circuit 504 of FIG. 5. The transistors $M_1$ and $M_3$ are designed symmetrically. When the temperature deviates from a constant value, the voltage difference between the source and gate of $M_1$ and the voltage difference between the source and gate of $M_3$ vary with the temperature and cause the variation of $V_A$ and $V_B$. By utilizing transistor $M_7$, the currents generated by transistors $M_2$ and $M_4$ (controlled by $V_A$ and $V_B$) counteract each other. Thus, the driving current that is generated by the voltage-current converting circuit 504 for driving the inverters of the delay units is constant at every temperature, and the circuit 506 driven by the driving current is independent of the temperature.

Figure 7:
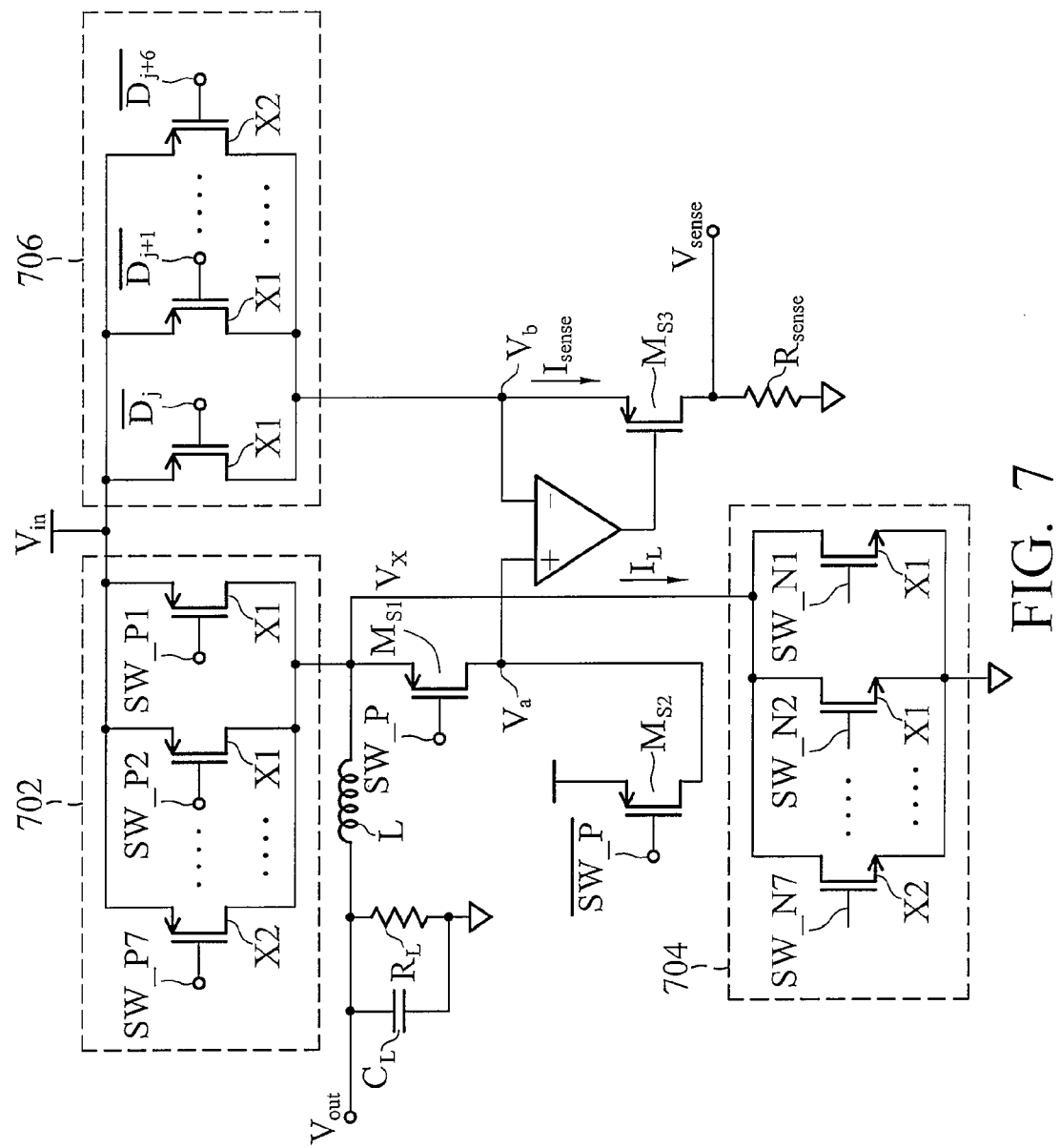
FIG. 7 illustrates an embodiment of the sensed voltage generating circuit 402.

FIG. 7 illustrates an embodiment of the sensed voltage generating circuit 402, wherein circuits 702 and 704 are the PMOS transistors and NMOS transistors of the variable Power MOS. In this embodiment, the sensed voltage generating circuit comprises a plurality of PMOS transistors for sensing (shown by circuit 706), which form a current mirror with the PMOS transistors in circuit 702 to shrink the current through the inductance L (symbolized by $I_L$) by a constant ratio K. The shrunk current is named a sensed current $I_{sense}$. The sensed current $I_{sense}$ flows through a sensing resistor $R_{sense}$ to generate a sensed voltage $V_{sense}$. As shown in FIG. 7, the total size conduction path provided by the PMOS transistors in circuit 702 is controllable and is dependent on $I_L$. To maintain K in constant, in the circuit 706, the actually conducted PMOS transistors have to be controlled according to $I_L$, too. Therefore, circuit 706 cannot be implemented with a large-sized PMOS transistor with a constant channel width, and should be implemented with a plurality of small-sized PMOS transistors coupled in parallel and respectively controlled by the digital bits $D_j \sim D_{j+6}$. The channel width to length ratios (W/L) of the small-sized PMOS transistors of circuit 706 are designed to copy those of the PMOS transistors of circuit 702. The conductance of the PMOS transistors of the circuit 706 are determined by the digital bits $D_j \sim D_{j+6}$ outputted from the load sensor.

The following provides an embodiment, wherein a conventional Power MOS providing constant conduction paths is replaced with a variable Power MOS having N=7. The size of the PMOS and NMOS transistors of the variable Power MOS have the following ratio, $M_{p1}:M_{p2}:M_{p3}:M_{p4}:M_{p5}:M_{p6}:M_{p7}=M_{n1}:M_{n2}:M_{n3}:M_{n4}:M_{n5}:M_{n6}:M_{n7}=1:1:2:2:2:2:2$. Thus, the total size of the conduction path provided by the active PMOS transistors or the active NMOS transistors may be x1, x2, x4, x6, x8, x10 or x12. In other embodiments, the conventional Power MOS can be replaced with a variable Power MOS having a greater N. The variable Power MOS having a greater N can provide more total size choices of the conduction path and the power efficiency of the DC-DC converter is improved by the increased N.

Figure 8:
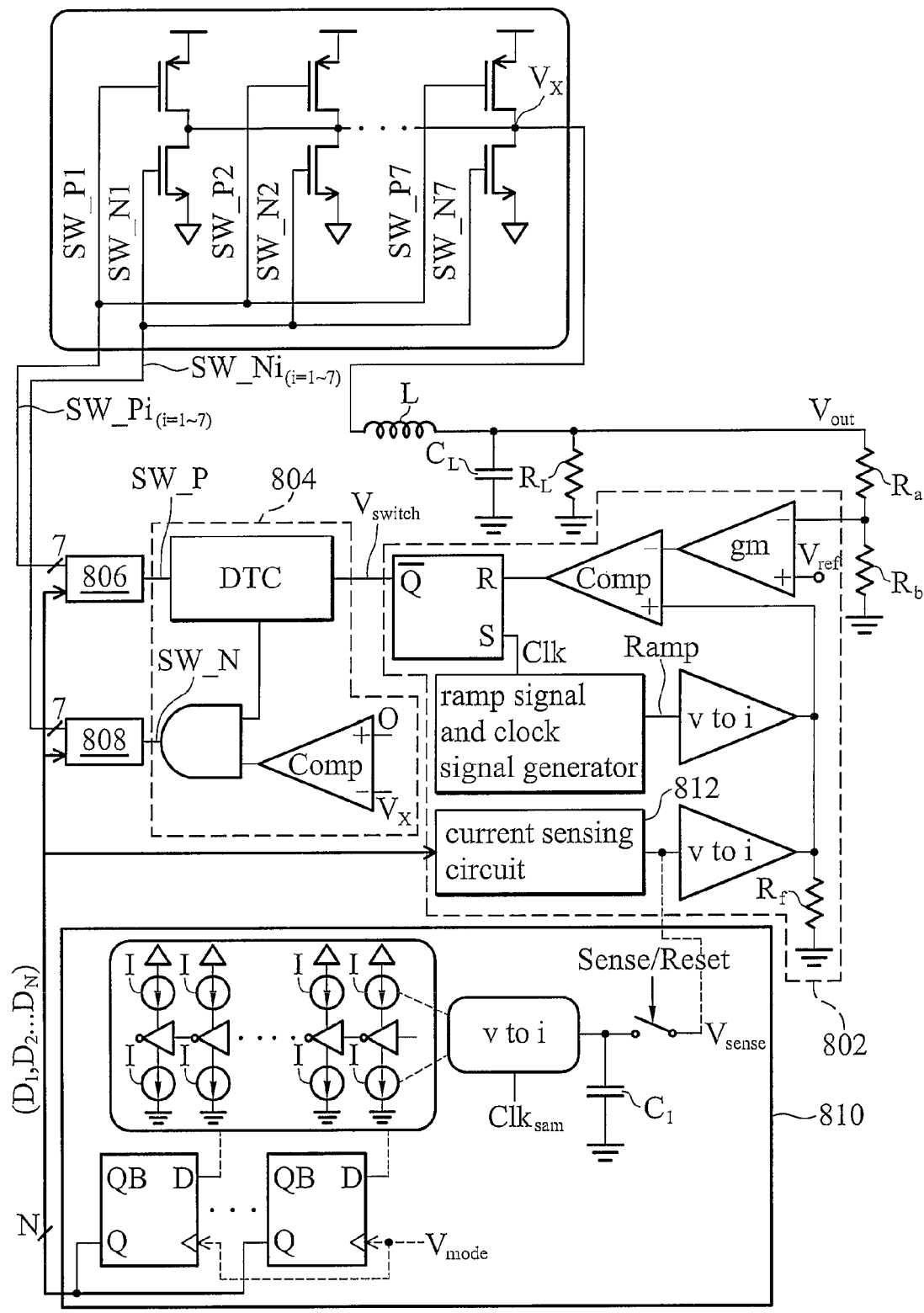
FIG. 8 illustrates an embodiment of the DC-DC converter of the invention.

FIG. 8 illustrates an embodiment of the DC-DC converter of the invention, wherein the PWM signal generator 802 and the Power MOS enable signal generator 804 is the same as circuits 102 and 104 shown in FIG. 1. Circuit 806 and circuit 808 form the Power MOS width controlling and driving device 302 of FIG. 3. Circuit 810 shows an embodiment of the digital-type ADC of the load sensor 202. Referring to FIG. 8, the current sensing circuit 812 of the PWM signal generator 802 accomplishes the function of the sensed voltage generator of the load sensor 202.

The invention further discloses DC-DC converters with a Dithering Skip Modulation control (DSM control) which reduces the unnecessary power consumption by uniformly blocking the unnecessary switching of the Power MOS.

Figure 9:
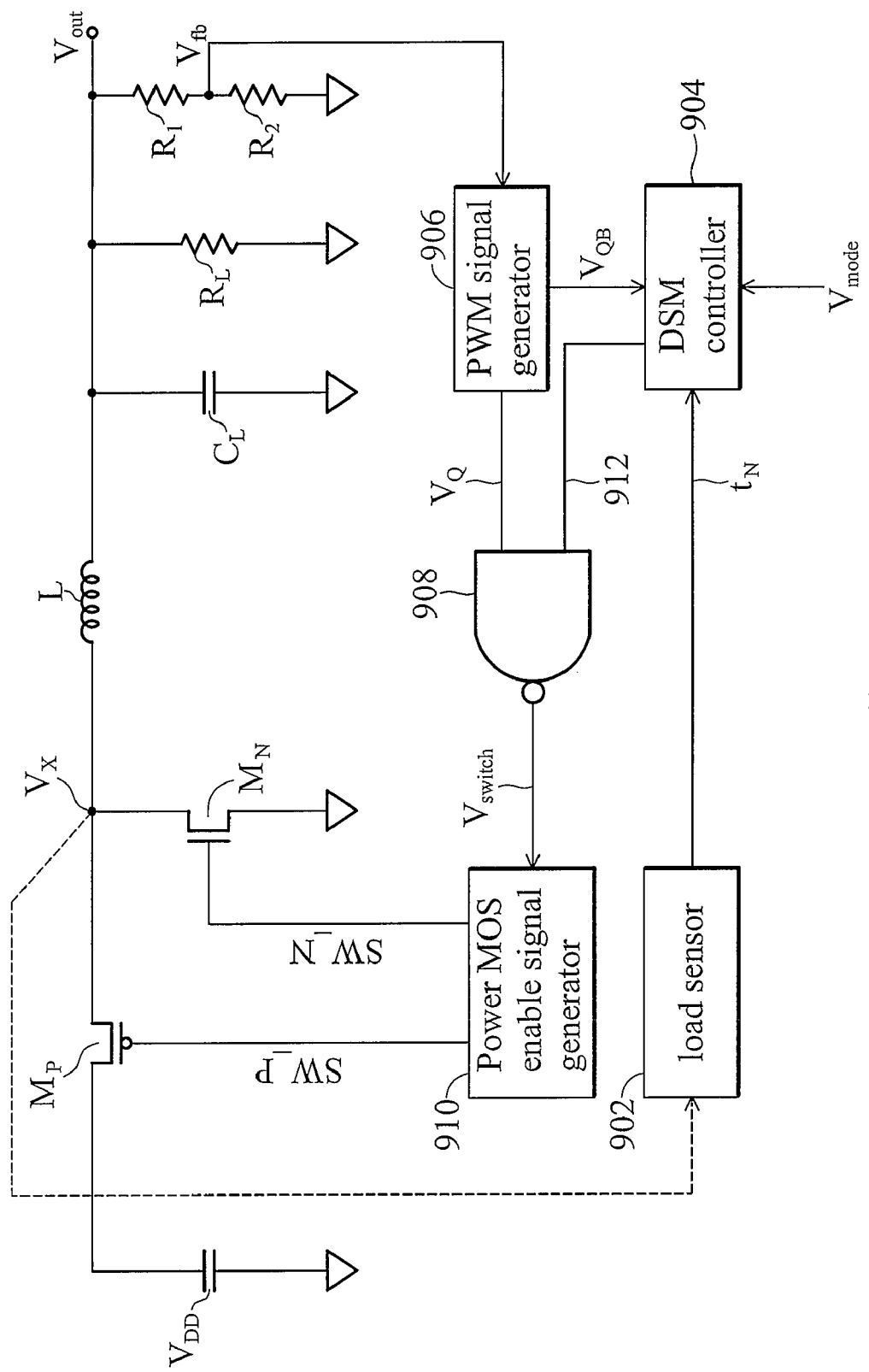
FIG. 9 illustrates an embodiment of the DC-DC converter of the invention with the DSM control.

FIG. 9 illustrates an embodiment of the DC-DC converter with the DSM control. The DC-DC converter comprises an inductance L, a load sensor 902, a Dithering Skip Modulation controller (DSM controller) 904, a PWM signal generator 906, an NAND gate 908, a Power MOS enable signal generator 910 and a Power MOS (composed of transistors $M_p$ and $M_n$). The load sensor 902 senses a load current of the DC-DC converter. The DSM controller 904 determines a Dithering Skip Modulation control section (DSM control section) based on the sensed load current (the lower the load current is, the longer the DSM control section is), and divides the DSM control section by a Dithering Skip Modulation unit length (DSM unit length) to output a Dithering Skip Modulation signal (DSM signal) 912, wherein each DSM unit length comprises a Dithering Skip Modulation indicator (DSM indicator) and the DSM signal 912 is low at the DSM indicators. The PWM signal generator 906 generates a PWM signal $V_{QB}$ based on the transformed DC voltage $V_{out}$ of the DC-DC converter. In the conventional technique illustrated in FIG. 1, the PWM signal is symbolized as $V_{switch}$, and is inputted to the Power MOS enable signal generator 104 to generate the PMOS transistor enable signal SW_P and the NMOS transistor enable signal SW_N. Instead of the signal transmitting method shown in FIG. 1, the embodiment shown in FIG. 9 inputs the PWM signal (symbolized as $V_{QB}$) into the DSM controller 904 to estimate the length of the DSM control section and divide the DSM control section into a plurality of the DSM unit lengths to generate the DSM signal 912. Signal $V_Q$ is the inverse signal of the PWM signal $V_{QB}$. Signal $V_Q$ and the DSM signal 912 are coupled to input terminals of the NAND gate 908. The signal $V_{switch}$ outputted from the NAND gate 908 is inputted to the Power MOS enable signal generator 910 to generate the PMOS transistor enable signal SW_P and the NMOS transistor enable signal SW_N to control the conductance of the PMOS transistor $M_p$ and the NMOS transistor $M_n$, respectively. Referring to FIG. 9, by controlling the conductance of the transistors $M_p$ and $M_n$, the transformed DC voltage output terminal (having a voltage level of $V_{out}$) is coupled to an original DC voltage $V_{DD}$ or ground through the inductance L, so that the transformed DC voltage $V_{out}$ is maintained at a constant voltage level. The PWM signal generator 906 and the Power MOS enable signal generator 910 may be replaced with the PWM signal generator 102 and the Power MOS enable signal generator 104 shown in FIG. 1 or any circuits having the same functions.

Figure 10:
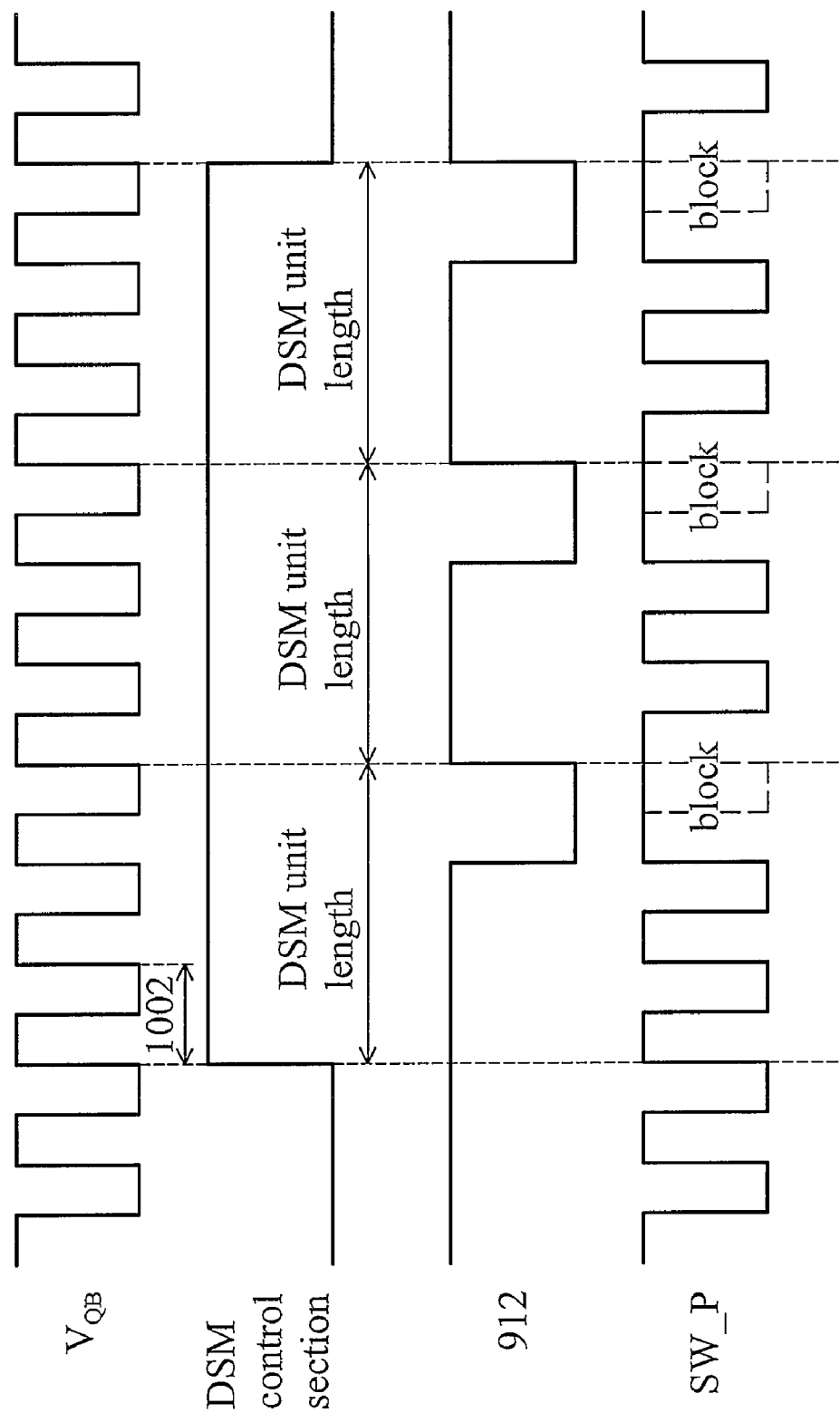
FIG. 10 illustrates the waveforms of the signals related to the DSM control technique.

FIG. 10 illustrates the waveforms of the signals related to the DSM control technique. Waveform $V_{QB}$ is the PWM signal generated by the PWM signal generator 906. In this example, the length of the DSM unit length equals to three switch periods of the PWM signal $V_{QB}$ (symbol 1002 indicates a single switch period), and each DSM unit length comprises a DSM indicator located at the last switch period of the three switch periods. In the embodiment shown in FIG. 10, the DSM control section can be divided into three DSM unit lengths, and the corresponding DSM signal is shown by waveform 912 which is low at the three DSM indicators of the three DSM unit lengths. Referring to FIG. 9, the inverse signal of the PWM signal $V_{QB}$ (symbolized by $V_Q$) and the DSM signal 912 are inputted to the NAND gate 908 to generate signal $V_{switch}$. The PMOS transistor enable signal SW_P is generated by the Power MOS enable signal generator 910 based on the signal $V_{switch}$. The waveform of the generated SW_P is shown in FIG. 10.

Figure 11:
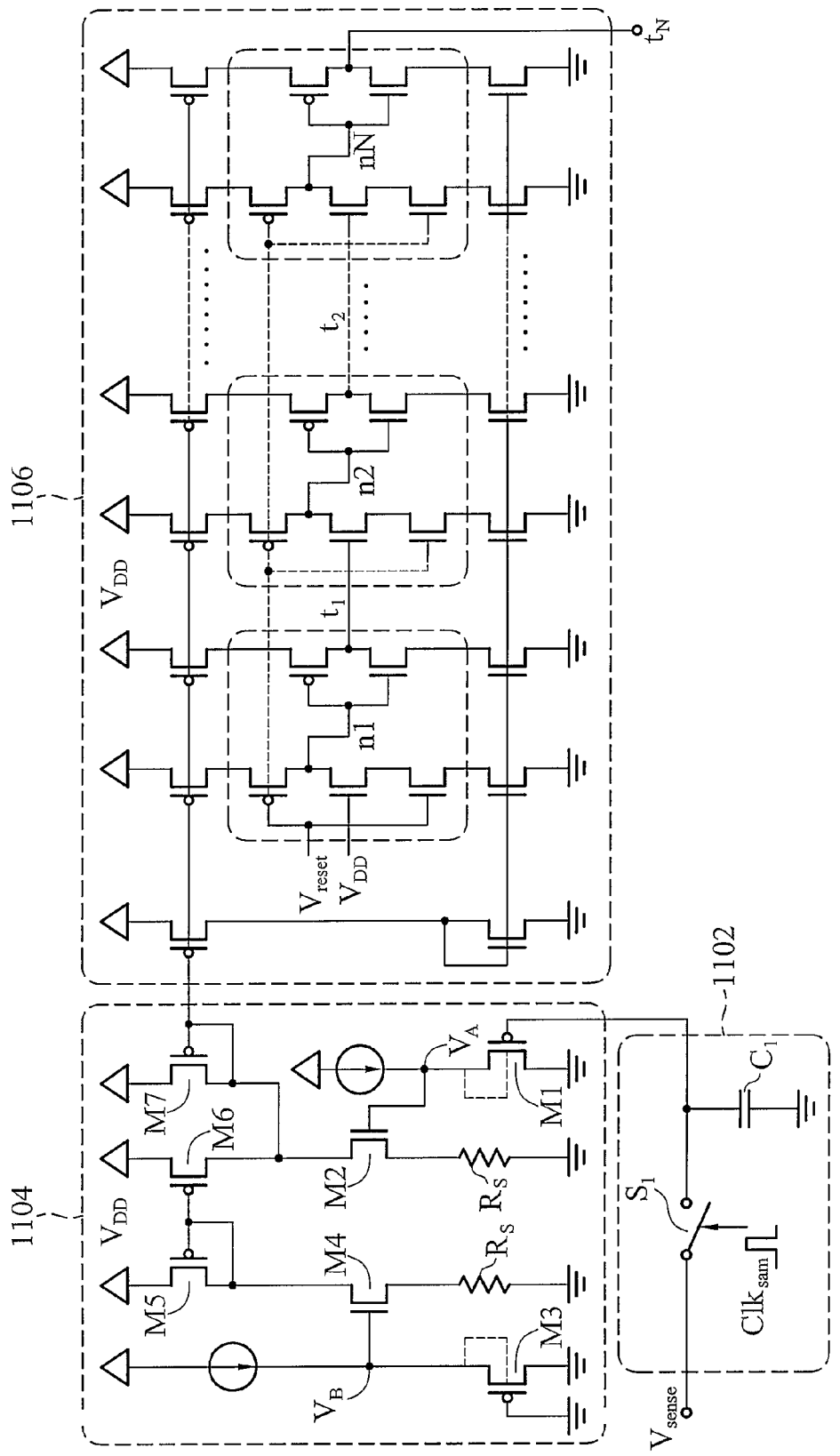
FIG. 11 illustrates an embodiment of the load sensor 902.

FIG. 11 illustrates an embodiment of the load sensor 902, which comprises a sample and hold circuit 1102, a voltage-current converting circuit 1104, and a current-driving delay circuit 1106, wherein the sensed voltage generating circuit of the load sensor 902 is not shown in FIG. 11. Comparing FIG. 11 with FIG. 5, the load sensor 902 does not comprise the D-type flip-flops and directly takes the output of a specific delay unit as the output signal (symbolized as $t_N$). The DSM controller 904 generates the DSM control section based on $t_N$ and a trigger signal $V_{mode}$.

Figure 12:
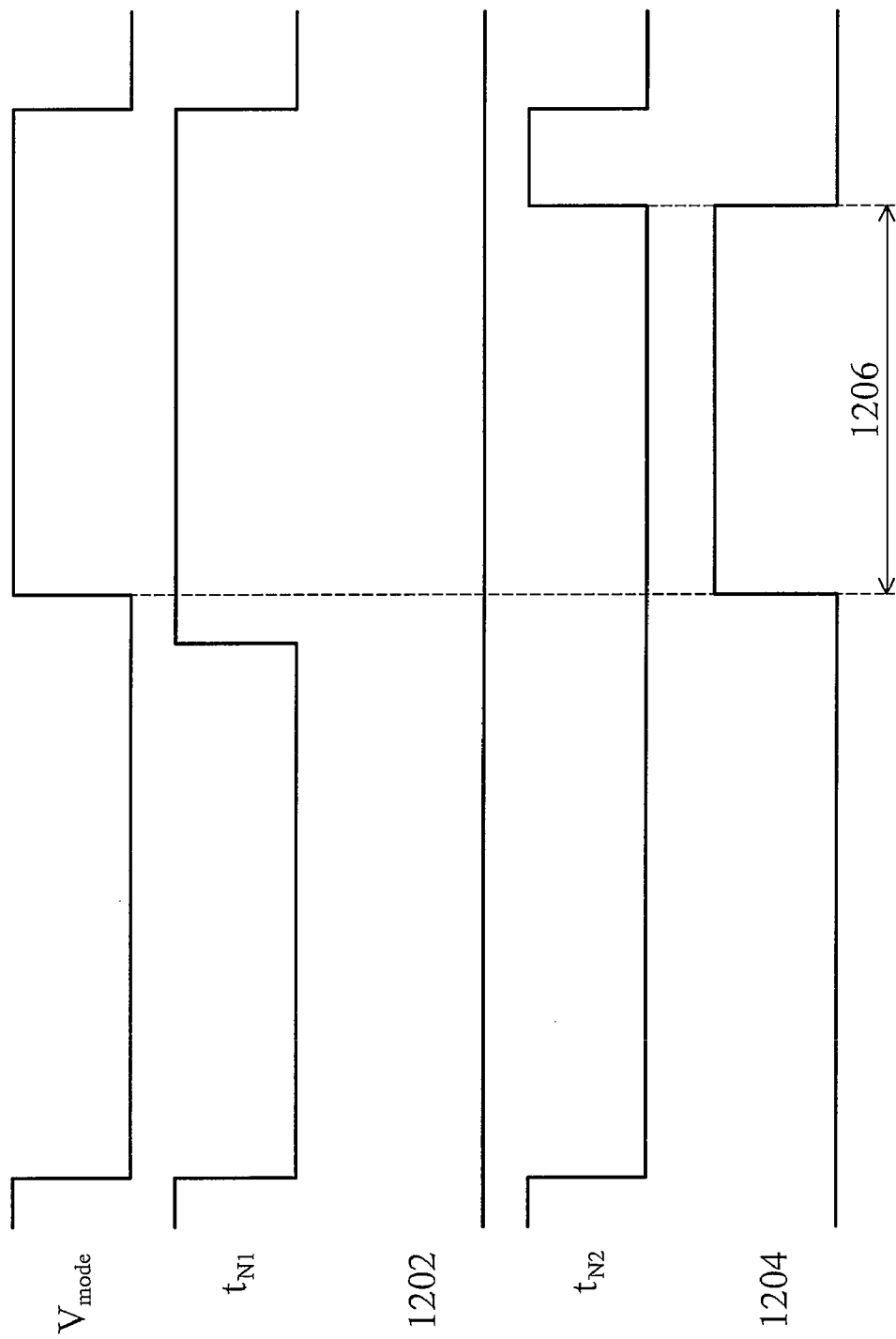
FIG. 12 shows how the signal $t_N$ and the trigger signal $V_{mode}$ affect the DSM control section.

FIG. 12 shows how the signal $t_N$ and the trigger signal $V_{mode}$ affect the DSM control section. The trigger signal $V_{mode}$ has a fixed waveform as shown in FIG. 12. $V_{mode}$ is high during a specific section. Referring to the circuits shown in FIG. 11, it is shown that the rising point of $t_N$ is determined by the load current. The greater the load current is, the earlier the signal $t_N$ rises from low to high. FIG. 12 introduces a heavy load example and a light load example. Waveform $t_{N1}$ shows the signal $t_N$ in the heavy load example and waveform $t_{N2}$ shows the signal $t_N$ in the light load example. The DSM controller 904 acknowledges the section where the trigger signal $V_{mode}$ is high but signal $t_N$ has not risen from low to high as the DSM control section. In the heavy load example, there comprises no DSM control section because signal $t_{N1}$ had already risen to high before the trigger signal $V_{mode}$. The waveform 1202 symbolizing the DSM control section is kept in low. To sum up, in the heavy load example, the DSM control is not required because there is no unnecessary Power MOS switching. In the light load example, signal $t_{N2}$ is raised to high after the trigger signal $V_{mode}$. Waveform 1204 shows the corresponding DSM control section is high during section 1206. To sum up, in the light load example, the DSM control should be adopted because there is unnecessary Power MOS switching.

Figure 13:
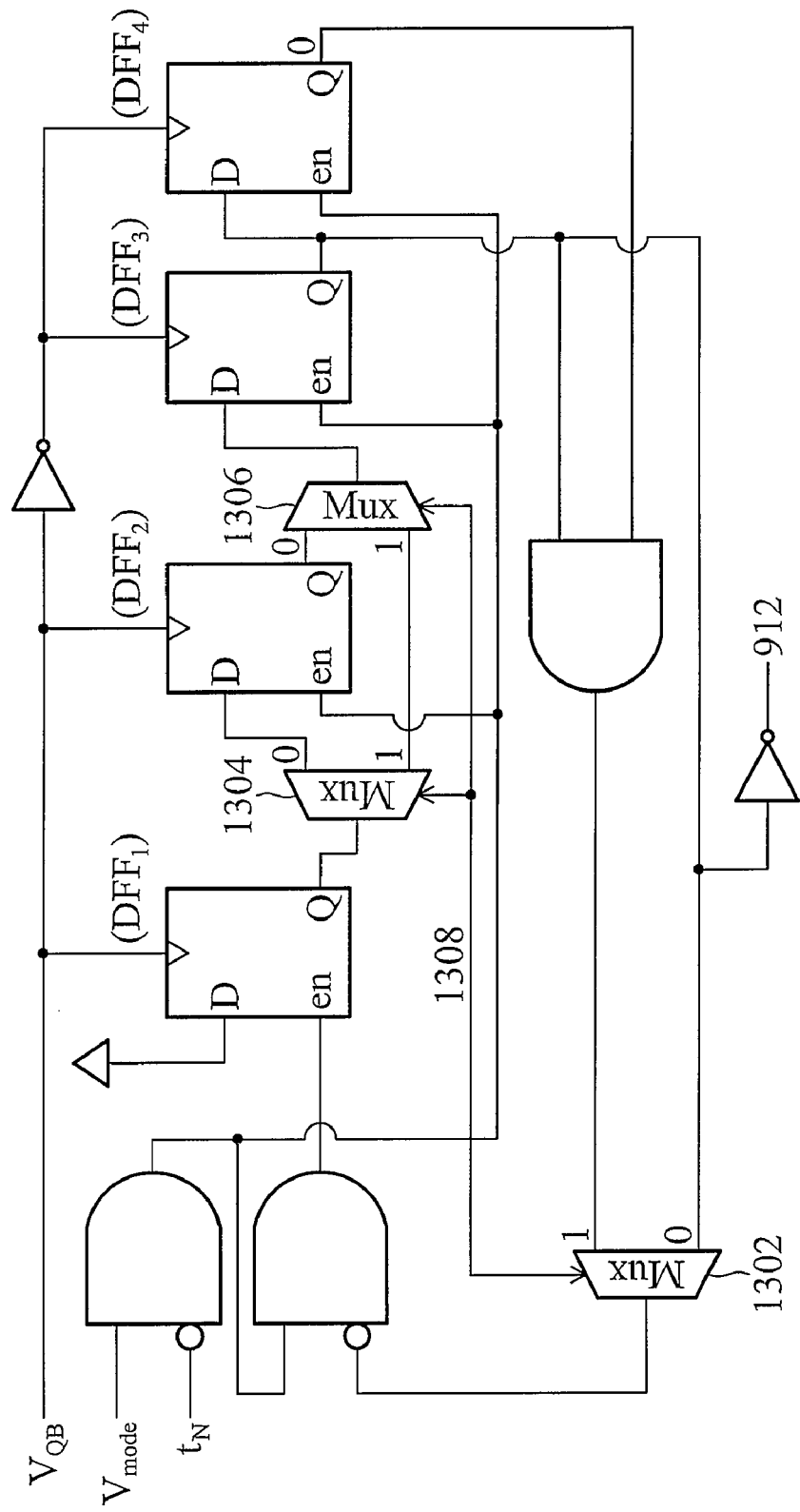
FIG. 13 illustrates an embodiment of the DSM controller 904.

FIG. 13 illustrates an embodiment of the DSM controller 904, comprising a plurality of D-type flip-flops all triggered according to the PWM signal $V_{QB}$. Counting the pulses of the PWM signal $V_{QB}$, the circuit shown in FIG. 13 divides the DSM control section by DSM unit length to generate the DSM signal 912. In addition to comprising three input terminals receiving the PWM signal $V_{QB}$, the trigger signal $V_{mode}$ and signal $t_N$, respectively, the DSM controller comprises a DSM control setting terminal 1308 for setting the length of the DSM indicator. In the embodiment shown in FIG. 13, the DSM control setting terminal 1308 may be inputted '0' or '1'. When the signal inputted into the DSM control setting terminal 1308 is '0', the length of each DSM indicator is set to be one switching period of the PWM signal $V_{QB}$. When the signal inputted into the DSM control setting terminal 1308 is '1', the multiplexers 1302, 1304 and 1306 select the signals at the second input terminals (labeled as '1') as their input, and the length of each DSM indicator is set to be two switching periods of the PWM signal $V_{QB}$.

Figure 14:
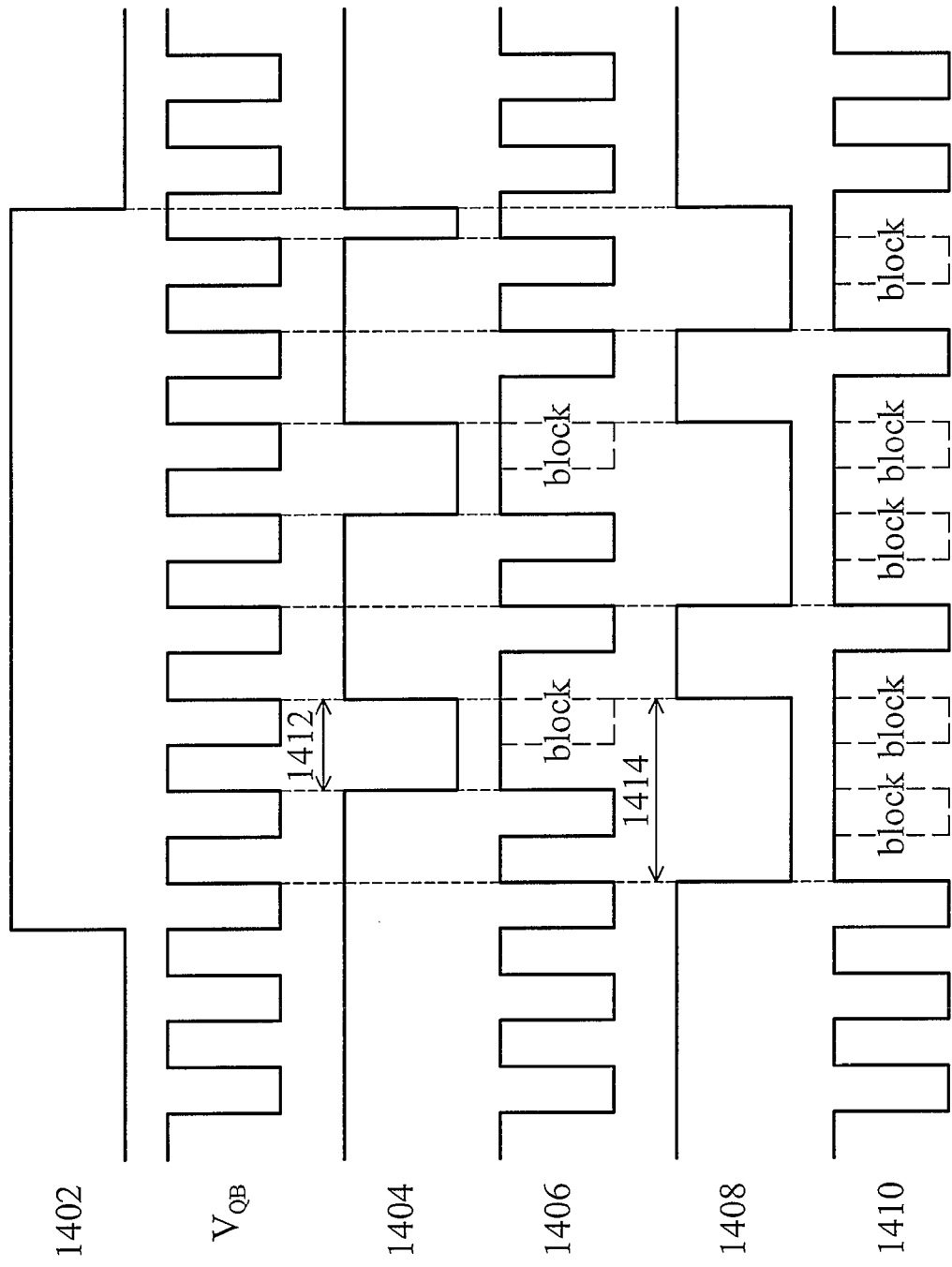
FIG. 14 shows waveforms of signals related to the DSM control, explaining how the DSM control setting affects the PMOS transistor enable signal SW_P.

FIG. 14 shows waveforms of signals related to the DSM control, explaining how the DSM control setting affects the PMOS transistor enable signal SW_P. Waveform 1402 marks the DSM control section as high. When the signal at the DSM control setting terminal 1308 is '0', the corresponding DSM signal is shown by waveform 1404, wherein the length of a DSM indicator 1412 equals to one switching period of the PWM signal $V_{QB}$. The corresponding PMOS transistor enable signal SW_P is shown by waveform 1406. When the signal at the DSM control setting terminal 1308 is '1', the corresponding DSM signal is shown by waveform 1408, wherein the length of a DSM indicator 1414 equals to two switching periods of the PWM signal $V_{QB}$. The corresponding PMOS transistor enable signal SW_P is shown by waveform 1410. Referring to waveforms 1406 and 1410 the unnecessary PMOS transistor enable actions are blocked so that power efficiency is improved.

Figure 15:
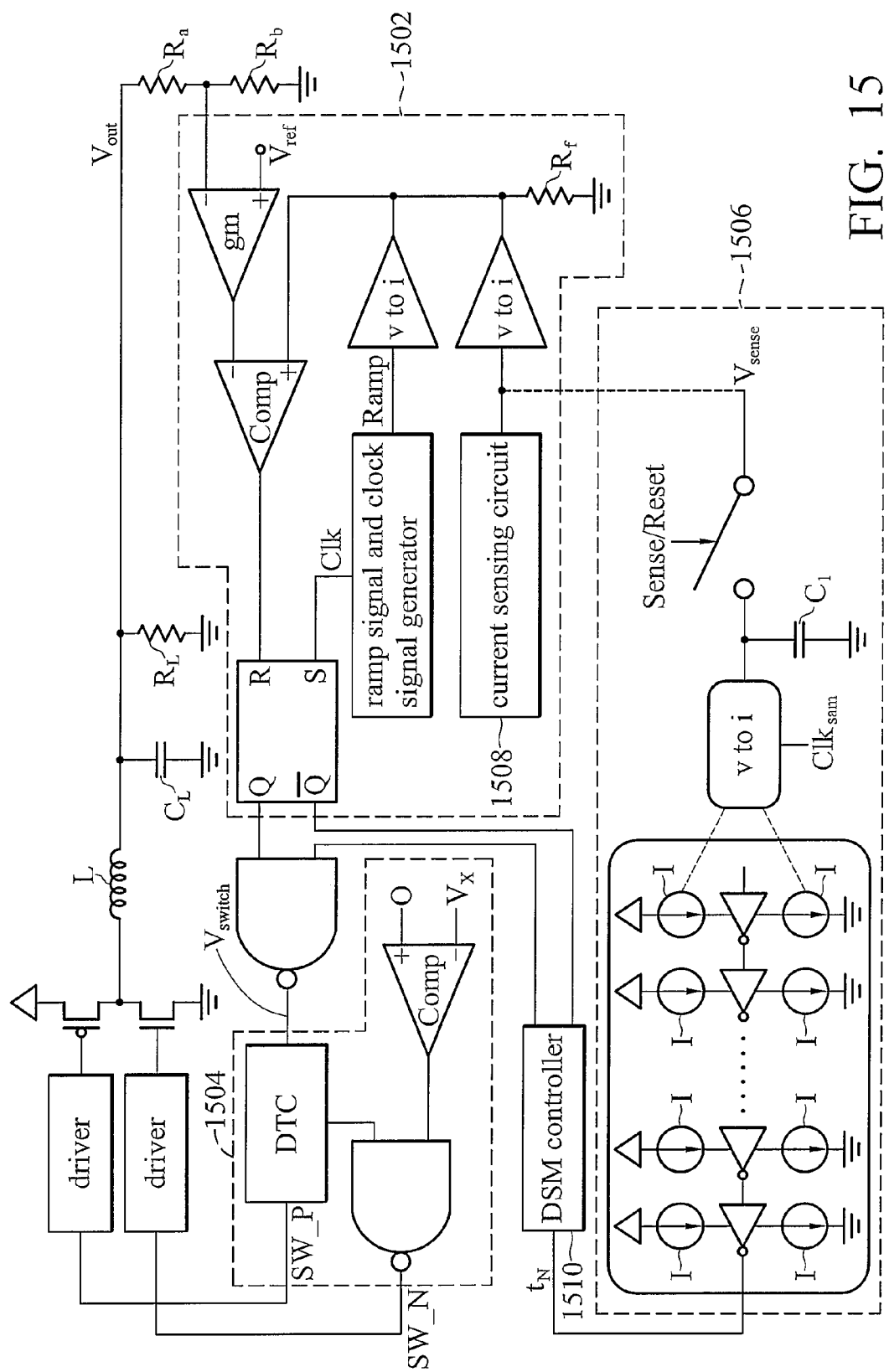
FIG. 15 illustrates an embodiment of the DC-DC converter of the invention which includes the DSM control technique.

FIG. 15 illustrates an embodiment of the DC-DC converter of the invention which includes the DSM control technique. Block 1506 and the current sensing circuit 1508 form the load sensor 902 of FIG. 9. The DSM controller 1510 may be implemented by the circuit shown in FIG. 13.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A DC-DC converter, comprising:
   a load sensor, sensing a load current of the DC-DC converter;
   a variable Power MOS, comprising a plurality of PMOS transistors coupled in parallel and a plurality of NMOS transistors coupled in parallel; and
   a Power MOS width controlling and driving device, coupled between the load sensor and the variable Power MOS, and controlling the conduction of the PMOS and NMOS transistors according to the sensed load current.

2. The DC-DC converter as claimed in claim 1, further comprising an inductance coupling the variable Power MOS to a transformed DC voltage output terminal of the DC-DC converter, wherein the transformed voltage output terminal is coupled to an original DC voltage via the inductance and the PMOS transistors or is coupled to ground via the inductance and the NMOS transistors.

3. The DC-DC converter as claimed in claim 2, wherein the sources of the PMOS transistors are coupled to the original DC voltage and the drains of the PMOS transistors are coupled to a first terminal coupling to the transformed voltage output terminal via the inductance, and the drains of the NMOS transistors are coupled to the first terminal and the sources of the PMOS transistors are coupled to the ground.

4. The DC-DC converter as claimed in claim 3, wherein the load sensor transforms the sensed load current into a thermometer code that represents the sensed load current by a plurality of digital bits.

5. The DC-DC converter as claimed in claim 4, wherein each of the digital bits relates to one of the PMOS transistors and one of the NMOS transistors.

6. The DC-DC converter as claimed in claim 5, wherein the Power MOS width controlling and driving device comprises:
   a plurality of first control units, each relating to one of the PMOS transistors and one of the digital bits, and each controlling the conductance of the corresponding PMOS transistor according to the corresponding digital bit while a PMOS transistor enable signal is enabled; and
   a plurality of second control units, each relating to one of the NMOS transistors and one of the digital bits, and each controlling the conductance of the corresponding NMOS transistor according to the corresponding digital bit while an NMOS transistor enable signal is enabled.

7. The DC-DC converter as claimed in claim 6, wherein each of the first control units comprises:
   a logic circuit, outputting a low level signal when the PMOS transistor enable signal is enabled and the corresponding digital bit is high; and
   a driving circuit, pulling the low level signal down to the ground to completely turn on the corresponding PMOS transistor.

8. The DC-DC converter as claimed in claim 6, wherein each of the second control units comprises:
   a logic circuit, outputting a high level signal when the NMOS transistor enable signal is enabled and the corresponding digital bit is high; and
   a driving circuit, pulling the high level signal to approach the original DC voltage to completely turn on the corresponding NMOS transistor.

9. The DC-DC converter as claimed in claim 4, wherein the load sensor comprises:
   a sensed voltage generating circuit, lowering the current of the inductance by a constant ratio to generate a sensed current and driving the sensed current to flow through a sensing resistor to generate a sensed voltage;
   a sample and hold circuit, sampling the sensed voltage;
   a voltage-current converting circuit, converting the sampled sensed voltage into a driving current proportional to the sensed voltage;
   a current driving delay circuit, comprising a plurality of delay units coupled in series to transmit a high level signal, wherein each of the delay units comprises a plurality of inverters coupled in series and each of the inverters is driven by the driving current; and
   a plurality of D-type flip-flops, having a one-to-one relationship to the delay units and all triggered by a trigger signal to gather the output signals of the delay units as the digital bits.

10. The DC-DC converter as claimed in claim 9, wherein the sensed voltage generating circuit further comprises a plurality of PMOS transistors for sensing, which form a current mirror with the PMOS transistors of the Power MOS to shrink the current through the inductance by a constant ratio, wherein the PMOS transistors for sensing are coupled in parallel and the conductance of the PMOS transistors for sensing are controlled by the digital bits.

11. A DC-DC converter, comprising:
    a load sensor, sensing a load current of the DC-DC converter;
    a Dithering Skip Modulation controller, generating a Dithering Skip Modulation control section which length is inverse proportional to the sensed load current, and dividing the Dithering Skip Modulation control section by a Dithering Skip Modulation unit length to generate a Dithering Skip Modulation signal, wherein each Dithering Skip Modulation unit length comprises a Dithering Skip Modulation indicator and the Dithering Skip Modulation signal is low at the Dithering Skip Modulation indicators;
    a PWM signal generator, generating a PWM signal based on a transformed DC voltage of the DC-DC converter;
    an NAND gate, having input terminals coupled with the inverse signal of the PWM signal and the Dithering Skip Modulation signal;
    a Power MOS enable signal generator, generating a PMOS transistor enable signal and an NMOS transistor enable signal based on the output of the NAND gate; and
    a Power MOS, controlled by the PMOS transistor enable signal and the NMOS transistor enable signal to adjust the transformed DC voltage.

12. The DC-DC converter as claimed in claim 11, further comprising an inductance coupling the Power MOS to the terminal of transformed DC voltage, wherein the Power MOS couples the inductance to an original DC voltage or ground according to the PMOS transistor enable signal and the NMOS transistor enable signal.

13. The DC-DC converter as claimed in claim 12, wherein the load sensor comprises:
    a sensed voltage generating circuit, lowering the current of the inductance by a constant ratio to generate a sensed current, and driving the sensed current to flow through a sensing resistor to generate a sensed voltage;
    a sample and hold circuit, sampling the sensed voltage;
    a voltage-current converting circuit, converting the sampled sensed voltage to a driving current proportional to the sampled sensed voltage; and
    a current driving delay circuit, comprising a plurality of delay units coupled in series to transmit a high level signal, wherein each of the delay units comprises a plurality of inverters coupled in series and each inverter is driven by the driving current.

14. The DC-DC converter as claimed in claim 13, wherein the Dithering Skip Modulation controller comprises:
 a first input terminal, coupling the output terminal of a specific delay unit; and
 a second input terminal, coupling a trigger signal that rises from low to high at a fixed time point,
 wherein the Dithering Skip Modulation control section is located at the time section where the signal at the first input terminal has not risen from low to high and the signal at the second input terminal is high.

15. The DC-DC converter as claimed in claim 14, wherein the Dithering Skip Modulation controller further comprises:
 a third input terminal, coupling the PWM signal; and
 a plurality of D-type flip-flops, triggered according to the PWM signal, and counting the pulses of the PWM signal to divide the Dithering Skip modulation control section and generate the Dithering Skip Modulation signal.

16. The DC-DC converter as claimed in claim 12, wherein the Dithering Skip Modulation controller further comprises a Dithering Skip Modulation control setting terminal setting the length of the Dithering Skip Modulation indicator.

* * * * *